Sept. 25, 1951

K. RAHBEK 2,568,824

SEMICONDUCTOR UNIT FOR THE UTILIZATION OF ELECTROADHESION

Filed Aug. 7, 1947

INVENTOR
KNUD RAHBEK
BY Otto Munk
HIS ATTY

Patented Sept. 25, 1951

2,568,824

UNITED STATES PATENT OFFICE 2,568,824

SEMICONDUCTOR UNIT FOR THE UTILIZATION OF ELECTROADHESION

Knud Rahbek, Frederiksberg, Denmark

Application August 7, 1947, Serial No. 767,310
In Denmark February 27, 1946

Section 1, Public Law 690, August 8, 1946
Patent expires February 27, 1966

2 Claims. (Cl. 179—108)

The invention relates to a semi-conductor unit for the utilisation of electro-adhesion i. e. a mutual attraction between a semi-conductor and a conductor when an electrical current passes through their contacting surfaces, and consists of a conductor and a semi-conductor in contact with and moving in relation to one another along the contact surface. As is known, it has appeared that such semi-conductor units when using direct current will change their properties after relatively short use, in such a manner that the friction between the contact surfaces due to their mutual attraction will change considerably. It has appeared that such changes in the properties of the unit may be obviated by sending changing currents through the unit in such a way as to obviate a continuous excess of electrochemical change. This method does not permit of the direct use of direct current voltage, but requires that the D. C. voltage be changed into alternating voltage by means of a commutator. The object of the present invention is to indicate such semi-conductor units as will permit the direct use of direct current. According to the invention this is achieved by the conductor of the unit being divided into two parts insulated from one another and each connected with one terminal of the power source of the unit.

Thereby the two parts of the conductor will be of opposite polarity in relation to the semiconductor in contact with both parts. During the movement of the semi-conductor each surface unit will thus first contact one part with one polarity and then the other part with the opposite polarity, so that the voltage gradient of the surface unit will change and continuous electro-chemical changes in the unit will be obviated.

In order to increase the frequency with which each surface unit of the semi-conductor is being exposed to changing voltage gradients, either of the parts of the conductor may according to the invention be divided into several interposed segments.

Figure 1:
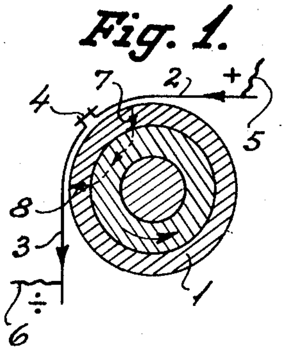
Figure 1 shows in diagram a cross-section through a semi-conductor unit according to the invention.

The semi-conductor unit shown in Figure 1 consists in known manner of a cylinder 1, constructed of semi-conducting material, on the surface of which is extended a band of conducting material, which band according to the invention is divided into two parts 2 and 3, insulated from one another. In the embodiment shown in Figure 1, these parts are considered joined to one another by an insulating connection. Parts 2 and 3 are connected by wires 5 and 6 to the positive and negative poles of the unit respectively. As indicated by arrows 7 and 8, the voltage gradient under part 2 will turn into the semi-conductor 1, and under part 3 away from the semi-conductor. Therefore, when the semi-conductor 1 is rotated a point of its surface lying for the moment under the part 2 of the conducting band, see Fig. 1, will shortly thereafter lie under the part 3. In the first instance the gradient will have the direction, as indicated by the arrow 7, and a moment later the gradient will be directed, as indicated by the arrow 8. Therefore, during a revolution each point of the said surface will be alternately affected by inward and outward gradients.

When a modulated potential is applied to the band 2, 3 the contacting surfaces of the band 2, 3 and the rotating cylinder 1 consisting of a semiconducting substance will be attracted to each other with a force varying in accordance with the varying potential. Accordingly the friction exerted from the cylinder on the band will vary and therefore the traction force acting lengthwise on the band 2, 3 will vary in accordance with the modulated potential so that the unit can be used for exerting a pull on members of a multitude of different apparatuses. As the cylinder 1 can be driven by a motor and a considerable fraction of the energy applied on the cylinder will be transported to the band, it is evident that the unit will be very powerful. When the unit as shown in Fig. 2 for example is used for driving a loud-speaker it is therefore easily possible with simple means to obtain much greater sound energies than obtainable with any other known device.

It is therefore of utmost interest to be able to build such units which are able to work faultlessly for a long time. This is attained by the present invention in comparison with known devices based on the Johnsen-Rahbek effect as hereinabove stated.

Figure 2:
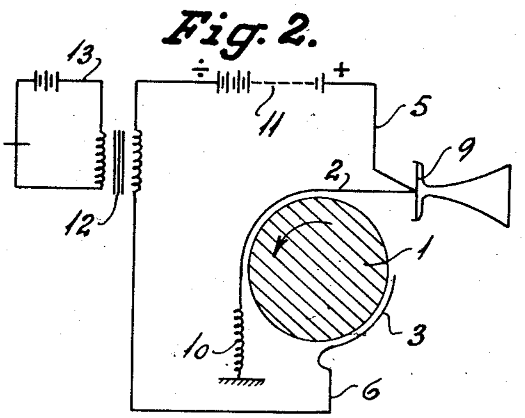
Figure 2 shows a loudspeaker with built-in unit according to the invention.

In Figure 2 the loudspeaker assembly consists of a semi-conductor unit according to the invention with a conductor divided into two parts 2 and 3, part 2 being in known manner kept extended by a spring 10, and connected with the diaphragm 9 in the sound producer, whereas in this instance part 3 partakes of the form of a slide-shoe. The unit is fed by a D. C. battery 11, which through wires 5 and 6 is connected with parts 2 and 3, respectively, and through a transformer 12, being affected by voltages from a microphone circuit 13.

Figure 3:
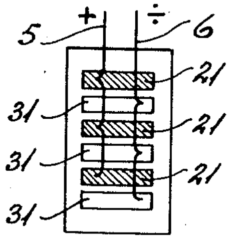
Figure 3 shows a conductor band seen from the inside.
Figure 4:
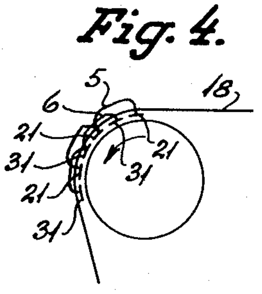
Figure 4 shows same placed on a semi-conducting cylinder side view.

Instead of changing the direction of the voltage gradient only twice during each revolution of the semi-conductor, as shown in Figs. 1 and 2, each of the parts of the conductor may be divided up into several segments. In the embodiment shown in Figures 3 and 4, this has been attained by the use of a band 18, made of insulating material, on the inner side of which parts 2 and 3 are placed, part 2 being divided into segments 21, which are interconnected and connected with the positive pole of the unit by the wire 5, while at the same time part 3 is divided into similar segments 31, which are interconnected and connected with the negative pole of the unit by the wire 6.

Figures 5, 6, 7:
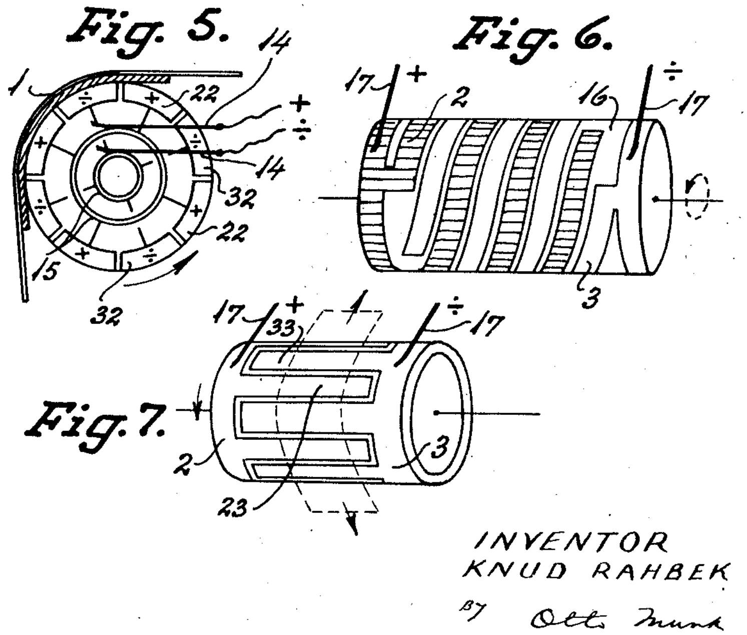
Figure 5 shows a cross-section of a semi-conductor unit constructed in a different way.
Figure 6 shows in perspective a conducting cylinder, side view.
Figure 7 shows in the same way a conducting cylinder in another embodiment.

In the embodiment shown in Figure 5, the semi-conductor 1 is placed as a band around a revolving cylinder built of conducting material, which cylinder according to the invention is divided into two parts, each again divided into several segments 22 and 32, respectively in the same way as commutator segments. These segments are provided with positive and negative voltages through brushes 14 with appertinent commutator-rings 15.

Figure 6 shows a conducting cylinder built of two parts, 2 and 3, in which the parts 2 and 3 are formed as helices, countersunk in a double threading in a cylinder, 16, made of insulating material. The two parts 2 and 3 are by brushes 17, each provided with its potential. If on such a cylinder a semi-conducting band corresponding to that shown in Figure 5 is placed, each unit of its surface will during one revolution of the cylinder come into alternate contact with parts 2 and 3.

A corresponding cylinder, but constructed in a somewhat different way, is shown in Figure 7. In this instance the two parts 2 and 3 are formed like combs, the teeth 23 and 33 of which engage between each other.

The invention may be executed in many ways other than those shown by way of examples in the drawing.

I claim:

1. Device for utilization of electro-adhesion between contacting surfaces of bodies traversable by electric current for actuating an apparatus, one of said bodies comprising in combination two mutually insulated metallic parts fixed side by side and having a smooth surface thereon; electrical connections for connecting each of said metallic parts with opposite poles of a voltage source, the other of said bodies consisting of a semi-conducting material having a volume resistivity lying between $10^1$ and $10^9$ ohm-centimeter; means for yieldingly pressing said semi-conducting body against the smooth surface on the other body and means for moving one of said bodies in relation to the other along the contacting surfaces and means for transmitting the hereby caused movements of the other body to the apparatus actuated thereby.

2. Device as claimed in claim 1 in which each of the two metallic parts is subdivided into electrically interconnected segments arranged in alternating succession.

KNUD RAHBEK.

REFERENCES CITED

The following references are of record in the file of this patent:

UNITED STATES PATENTS

| Number | Name | Date |
|---|---|---|
| 221,957 | Edison | Nov. 25, 1879 |
| 678,566 | Higham | July 16, 1901 |
| 1,446,748 | Johnson et al. | Feb. 27, 1923 |
| 1,533,757 | Rahbek et al. | Apr. 14, 1925 |
| 1,666,182 | Schmierer | Apr. 17, 1928 |
| 1,690,011 | House | Oct. 30, 1928 |
| 1,702,935 | Edison | Feb. 19, 1929 |
| 2,025,123 | Rahbek | Dec. 24, 1935 |

FOREIGN PATENTS

| Number | Country | Date |
|---|---|---|
| 533,368 | France | Mar. 1, 1922 |